United States Patent

[11] 3,590,724

| [72] | Inventor | Walter R. Lorang<br>23309 West Maple Road, Walled Lake,<br>Mich. 48088 |
|---|---|---|
| [21] | Appl. No. | 19,921 |
| [22] | Filed | Mar. 16, 1970 |
| [45] | Patented | July 6, 1971 |

[54] HOT DRINK MACHINE
10 Claims, 2 Drawing Figs.

[52] U.S. Cl. ................................................. 99/290,
99/295, 99/306
[51] Int. Cl. ....................................................... A47j 31/10
[50] Field of Search ........................................... 99/290,
304, 295, 288, 306, 281, 283

[56] References Cited
UNITED STATES PATENTS

| 2,366,384 | 1/1945 | Cavicchioli | 99/290 |
| 3,126,812 | 3/1964 | Nau | 99/290 |
| 3,122,987 | 3/1964 | Ruhnke | 99/290 |
| 3,220,334 | 11/1965 | Martin | 99/304 |
| 3,451,329 | 6/1969 | Herrera | 99/290 |

*Primary Examiner*—Robert W. Jenkins
*Attorney*—William T. Sevald

ABSTRACT: A hot drink machine having a cabinet comprising a truncated pyramidal base housing having a column on one end of the base housing, and a truncated pyramidal cap on the column; the portion of the base housing not occupied by the column constituting a platform; a coffee drip pot on said column over the platform; said cap covering the drip pot and covering about 25 percent of the column; the cabinet presenting an optically foreshortening aspect due to the conformation of the base platform and the cap and the partial coverage of the column by the cap; a hot water reservoir tank in the column primarily heated by a heavy duty immersion heater and having auxiliary light duty standby heater and a thermostat controlling the immersion heater on the outside of a metal bottom wall in the tank; a capillary action water dispersal plate and chamber on the drip pot and a brew can below the drip pot; a user filling the tank through an opening in the cabinet top; a faucet on the tank for drawing hot water; a user filling the drip pot through an opening in the cabinet above the drip pot; and condenser flanges and cup provided over the tank and drip pot to reduce vapor to liquid to prevent dripping outside the cabinet by returning the liquid to the tank or drip pot.

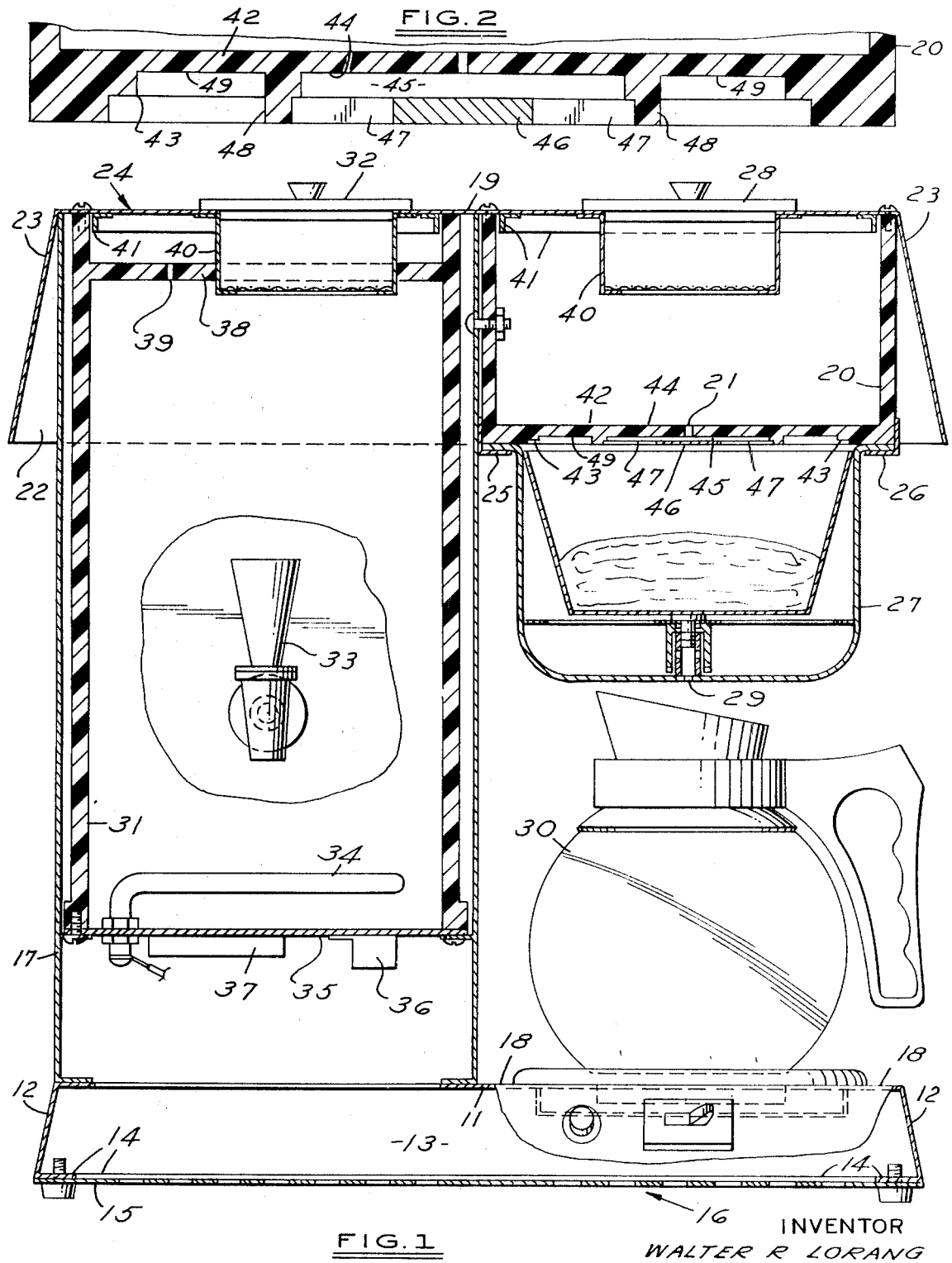

HOT DRINK MACHINE

This invention relates to a drip coffee and other hot drink making machine which is particularly suited to the needs of relatively small self-users and which is of novel drip-brew pot, hot water reservoir, drip chamber, and cabinet combination wherein water is poured by the user through the cabinet separately both as to the reservoir tank and the drip pot.

An object of the invention is to provide a hot drink machine which is highly useful for making coffee, tea, chocolate soup and other hot drinks.

An object of the invention is to provide a hot water reservoir tank in the machine which is automatically heated and available not only to make drip coffee but also available to make other hot drinks on an ever-ready basis and which is supplied with water through an aperture in the cabinet.

An object of the invention is to provide a heavy duty immersion heater in the reservoir tank controlled by a thermostat and a light duty heater on the reservoir tank for applying heat constantly during use periods to maintain the water at or about the high temperature setting of the thermostat.

An object of the invention is to provide a synthetic resin tank and an aluminum plate bottom wall in the tank through which the thermostat reacts to water temperature and through which the light duty heater introduces heat to the tank thereby eliminating the necessity of immersing the thermostat and the light duty heater and thereby avoiding the water problems incident to immersion.

An object of the invention is to provide a base housing and a hollow column on the base housing for holding the water tank and electrical apparatus.

An object of the invention is to provide a drip pot on the column above and over the base housing not occupied by the column so that the base housing serves as a platform for the brewed coffee receiving bowl.

An object of the invention is to provide a cap having outwardly inclined flanges over the drip pot and over the upper portion of the column to enclose same as part of the cabinet with the cabinet having an aperture over the drip pot for pouring water into the drip pot.

An object of the invention is to provide a wall having an aperture in the tank adjacent its upper end creating head space in the tank below the cap to provide a top limit water level gage for manual filling and also to provide expansion head-space above the wall for the water when heated to eliminate overflow of the tank.

An object of the invention is to provide vapor condenser flanges and cups on the cap above the tank and drip pot to return condensed liquid and to reduce escape of vapor and incident dripping on the outside of the machine.

An object of the invention is to provide slide tracks to support a brew can below the drip pot and a capillary action water spreader chamber and plate below the drip orifice of the drip pot to spread the dripping of water over an increased area in the brew can and to insure substantially equal dripping even if the machine is off-level.

An object of the invention is to provide drip steps on the under surface of the drip pot to return condensed liquid thereon to the brew can below and to substantially eliminate dripping outwardly of the brew can.

An object of the invention is to provide an attractive cabinet structure and conformation making the machine acceptable in places where such a machine is usually objectionable.

An object of the invention is to provide a base housing and top cap of truncated pyramidal shape in elevational view with the cap and base foreshortening the visual aspect of the height of the machine to provide a machine of good appearance.

These other objects of the invention will become apparent by reference to the following description of a hot drink machine embodying the invention taken in connection with the accompanying drawing in which:

FIG. 1 is a vertical cross-sectional view of the machine with broken away portions shown in elevation at the faucet and the switch; and FIG. 2 is an enlarged partial cross-sectional view of the bottom wall of the drip pot showing the drip steps and water spreader plate and chamber in more detail.

Referring now to the drawing wherein like numerals refer to like and corresponding parts throughout the two views, the hot drink machine 10 disclosed therein to illustrate the invention comprises, rectangular base plate 11 having opposite ends and sides. End walls 12 and sidewalls 13 angle downwardly-outwardly from the ends and sides of the base plate 11. Inwardly projecting flanges 14 are formed on the side end walls 12 and 13. A rectangular bottom plate 15 is removably secured to the flanges 14.

The base plate 11, the walls 12 and 13, and the bottom plate 15 constitute a base housing 16 for receiving enclosing electrical apparatus which is enterable for repair and replacement of electrical items by removing the bottom plate 15. The base housing is concentrically double rectangular in top plan view and truncated pyramidal shape in elevational view.

A hollow column 17, rectangular in cross section, and preferably square in cross section, has a bottom end mounted on the base plate 11 of the base housing 16 at one said end thereof. The base plate 11 in the location of the column 17 is cut out for communication between the interior of the base housing 16 and the interior of the hollow column 17. The base plate 11 in the area not occupied by the column 17 provides a receptacle bowl platform 18 adjacent the column 17.

A top plate 19, of substantially the same dimensions as the base plate 11, has opposite ends and opposite sides and is mounted on the column 17 at one end of the top plate 19 with the other end of the top plate 19 cantilevered outwardly of the column 17 over the base plate 11 platform 18 portion. The top plate 19 lies in substantially the same vertical plane as the base plate 11.

A drip pot 20 having a bottom drip orifice 21 is secured to the column 17 adjacent the top thereof and overlies the bowl platform 18 in spaced relation thereabove.

Inter-connected side eave flanges 22 and end eave flanges 23 on the top plate 19 extend downwardly outwardly from the top plate 19 and depend in increasing spaced relationship the column 17 and the drip pot 20. The flanges 22 and 23 enclose the drip pot 20 and screen off approximately 25 percent of the height of the column 17.

The top plate 19 provides a cover for the top of the column 17 and the drip pot 20. The eave flanges 22 and 23 have bottom edges lying outwardly beyond the vertical plane of the end walls 12, sidewalls 13, and bottom plate 15 of the base housing 16. The top plate 19 and eave flanges 22 and 23 comprise a top cap of concentrically double rectangular shape in top plan view and truncated pyramidal shape in side elevational view.

The base housing 16 and the top cap 24 shape and proportion in relation to the exposed portion of the column 17 provide in conjunction with one another an optically height reducing combination.

Slide tracks 25 and 26 are mounted below the drip pot 20. A brew can 27 for holding ground coffee has a lip slidably supportable on the tracks 25 and 26 to position and support the brew can 27 below the drip pot 20. A cover 28 removably covers an aperture in the top plate 19 of the cabinet for pouring water into the drip pot 20. The orifice 21 in the drip pot 20 emits water to the brew can 27. A hole 29 in the bottom of the brew can 27 emits brewed coffee therefrom into a receiving bowl 30. A water reservoir tank 31 lies in the column 17. A cover 32 removably covers an aperture in the top plate 19 of the cabinet for pouring water into the tank 31. A faucet 33 on column 17 leads to said tank 31 interior for drawing water from the tank 31. An immersion heater 34 in the tank 31 heats the water in the tank 31.

A user fills the tank 31 by pouring water through the aperture in the cabinet. A user in making hot soup, tea, chocolate, etc., draws water from the faucet 33 into a suitable container such as the bowl 30, and in making coffee, the user pours the hot water through the opening in the cabinet at cover 28 in said top plate 19 into the drip pot 20 from which the water drips through the orifice 21 into the brew can 27 and from the brew can hole 29 to the receptacle bowl 30 on the platform 18.

A metal plate 35 constitutes the bottom wall of the tank 31. A thermostat 36 on the bottom plate 35 outside the tank 31 is reactive to plate 35 temperature which, in turn, is reactive to water temperature in the tank 31 for controlling power to the immersion heater 34 to regulate water temperature in the tank 31.

A relatively small output heating element 37 on the plate 35 outside the tank 31 provides constant standby heat output during use periods to hold the water at a temperature adjacent the thermostat 36 cutoff upper setting to maintain the water temperature at a temperature adjacent the thermostat 36 upper temperature setting during times when the device is not used during use periods.

A vapor barrier wall 38 in the tank 31 is spaced from the top of the tank 31 creating water expansion head-space thereabove in the tank 31. The wall has an aperture 39 for permitting water to rise into the head-space when the water expands when heated. A solid sidewall perforate-bottom cup 40 is positioned in the top plate 19 aperture at the cover 32 and leads through the barrier wall 38 providing a vapor trap and preventing water poured into the tank 31 from entering the head-space and creating a gauge for ascertaining not overfilling the tank 31 above the barrier wall 38.

Depending internal flanges 41 on the top plate 19 above the tank 31 head-space constitute vapor condensers normally below head-space temperature due to thermal contact with the top plate 19. The flanges 41 convert vapor in the head-space to liquid and return the liquid to the tank 31 via said barrier wall aperture 39 thereby reducing vapor penetration to the inside of the column 17, to substantially eliminate condensation within the column 17. Depending flanges 41 are also on the top plate 19 within the drip pot 20 and they act as vapor condensers within the drip pot 20 as they are normally below drip pot 20 temperature due to thermal contact with the top plate 19. The flanges 41 convert vapor in the drip pot 20 to liquid and return the liquid to the drip pot 20 thereby reducing vapor inside the cap 24 around the drip pot 20 to substantially eliminate condensation in the cap 24 and dripping on the platform 18.

A solid wall perforate bottom cup 40 is also located in the opening of the top plate 19 at the cover 28 and provides a vapor trap over the drip pot 20 and prevents accidental introduction of foreign objects into the drip pot 20.

The drip pot 20 has a bottom wall 42 above the brew can 27 having a inwardly relieved annular surface 49 creating at least one annular step 43 constituting a drop-off point for liquid condensed from vapor on the bottom wall 42 above the brew can 27 to substantially eliminate dripping outwardly of the brew can 27. The drip pot 20 bottom wall 42 above said brew can 27 also has an inwardly relieved annular surface 44 creating an indented cavity 45 below the orifice 21. The bottom wall 42 also has an annular wall 48 around the orifice 21 and the cavity 45. A water spreader plate 46 is mounted on the wall 48 and covers the cavity 45 and creates a water dispersal chamber above the plate 46. The plate 46 has a solid center surrounded by radial slots 47 adjacent its outer periphery for spreading water dropping from the orifice 21 to radially outer positions before dripping into the brew can 27 to increase the area of ground coffee in the brew can 27 subjected to dripping.

Preferably the orifice 21 is 0.156 inches in diameter; the plate 46 is 2.75 inches in diameter; the slots 47 in the plate 46 are one sixteenth inch in width and three quarter inch in length; and the cavity 45 chamber head is one eighth inch in height between the plate 46 and the surface 44. When the water emits from the orifice 21 it contacts the plate 46 solid center and, by capillary action between surface 44 and the plate 46 solid center and solid portions of the plate 46 between the slots 47, the water works out to the annular wall 48 to the slots 47 and also fills the slots 47. After this capillary action and upon further supply of water, the slots 47 drip drops of water to the ground coffee in the brew can 27 below.

Due to the spacing between the parts, the capillary action of the water insures that water drops emit from all slots even if the plate 46 is not level such as due to an uneven or slanting surface upon which the machine rests.

The scope of the invention is defined in the appended claims.

I claim:

1. A hot drink maker and hot water reservoir combination machine ready for immediate use to make hot coffee, tea, chocolate, soup, etc., which is particularly suitable for relatively small volume self-users such as homes, offices, shops, stores, etc., and which has camouflaging and blending cabinet structure and conformation including an apparent low-silhouette rendering it acceptable for use in places where hot drink makers are usually found objectionable, comprising a rectangular base plate having opposite ends and sides; end walls and sidewalls angling downwardly-outwardly from said base plate ends and sides; inwardly projecting flanges on said side and end walls; a rectangular bottom plate removably secured to said flanges;

said baseplate, sidewalls, and bottom plate providing a base housing for receiving and enclosing electrical apparatus and enterable for repair and replacement of electrical items by removing said bottom plate; said base housing having opposite sides ends; said base housing being concentrically double rectangular in top plan view and truncated pyramidal shape in elevational view;

a hollow column rectangular in cross section having a bottom end mounted on said base plate of said base housing at one said end of said base housing; said base plate in the location of said column being cut out for communication between the interior of said base housing the interior of said hollow column; said base plate in the area not occupied by said column providing a receptacle bowl platform adjacent said column;

a top plate of substantially the same dimensions as said base plate; said top plate having opposite ends and opposite sides; said top plate being mounted on said column at one end of said top plate with the other end of said top plate cantilevered outwardly of said column over said base plate platform with said top plate lying in substantially the same vertical plane as said base plate;

a drip pot having a bottom drip orifice secured to said column adjacent the top of said column and overlying said bowl platform in spaced relation thereto above;

interconnected side eave flanges and end eave flanges on said top-plate extending downwardly and outwardly from said top plate and depending in increasing spaced relationship to said column and said drip pot over said drip pot and over approximately twenty five percent of the height of said column;

said top plate providing a cover for the top of said column and said drip-pot; said eave flanges having bottom ends lying outwardly beyond the vertical plane of said end walls, sidewalls and bottom plate of said base housing; said top plate and eave flanges comprising a top cap of concentrically double rectangular shape in top plan view and truncated pyramidal shape in side elevational view;

said base housing and said top cap shape proportion in relation to the exposed portion of said column providing in conjunction with one another an optically height reducing combination; said base housing, column, and top cap constituting a cabinet;

slide tracks mounted below said drip pot for removably supporting a brew can for holding ground coffee having a lip slidably supportable on said tracks to position the brew can below said drip pot; an opening in said top plate for pouring water through said cabinet into said drip pot; and a hole in the bottom of said brew can for emitting brewed coffee therefrom; a water reservoir tank in said column, an aperture in said top plate for pouring water through said cabinet into said tank; a faucet on said column leading to said tank interior for drawing water from said tank; and an immersion heater in said tank for heating the water therein;

a user in making hot soup, tea, chocolate, etc., drawing water from said faucet into a suitable container and in making coffee the user pouring the hot water through the opening in said cabinet into said drip pot from which the water drips through the orifice into the brew can and from the brew can hole to a receptacle on said platform.

2. In a device as set forth in claim 1, a metal plate constituting the bottom wall of said tank, and a thermostat on said bottom plate outside said tank reactive to plate temperature which in turn is reactive to water temperature in said tank for controlling power to said immersion heater to regulate water temperature in said tank.

3. In a device as set forth in claim 2, a relatively small heat output heating element on said plate outside said tank for constant heat output during use periods to hold the water at a temperature adjacent said thermostat cutoff upper setting to maintain the water temperature at a temperature adjacent said thermostat upper setting during standby times when the device is not used during use periods.

4. In a device as set forth in claim 1, a vapor barrier wall in said tank spaced from the top of said tank creating water expansion head-space thereabove in said tank; said wall having an aperture for permitting water to rise into said head-space when the water expands when heated.

5. In a device as set forth in claim 4, a perforate-bottom cup positioned in said top plate aperture and leading through said barrier wall providing a vapor trap and preventing water poured into said tank from entering said head-space and creating a gauge for properly filling said tank below said barrier wall.

6. In a device as set forth in claim 4, depending flanges on said top plate above said tank head-space constituting vapor condensers normally below head-space temperature due to thermal contact with said top plate for converting vapor in the head-space to liquid and for returning the liquid to said tank via said barrier wall aperture thereby reducing vapor penetration to the inside of said column to substantially eliminate condensation within said column.

7. In a device as set forth in claim 1, depending flanges on said top plate within said drip pot constituting vapor condensers within said brew pot normally below drip pot temperature due to thermal contact with said top plate for converting vapor in said drip pot to liquid and for returning the liquid to the drip pot thereby reducing vapor inside said cap around said drip pot to substantially eliminate condensation in said cap and dripping on said platform.

8. In a device as set forth in claim 1, a perforate bottom cup in the opening of said top plate providing a vapor trap over said drip pot and for preventing accidental introduction of foreign objects into said drip pot.

9. In a device as set forth in claim 1, said drip pot having a bottom wall above said brew can having an inwardly relieved surface creating at least one step constituting a drop-off point for liquid condensed from vapor above the brew can to substantially eliminate dripping outwardly of said brew can.

10. In a device as set forth in claim 1, said drip pot having a bottom wall above said brew can having an inwardly relieved surface creating an indented pocket around said drip orifice; and a water spreader plate over said pocket creating a water dispersal chamber above said plate; said plate having slots adjacent its outer periphery for spreading water from said orifice radially outer positions by capillary action between said plate and said pocket relieved surface before dripping into said brew can to increase the area of ground coffee subjected to dripping and to insure substantially equal dripping from said plate slots if the machine is off-level.